US011376996B2

(12) United States Patent
Fujita et al.

(10) Patent No.: US 11,376,996 B2
(45) Date of Patent: Jul. 5, 2022

(54) RECLINING DEVICE AND SEAT (71) Applicant: DELTA KOGYO CO., LTD., Aki-gun (JP)

(72) Inventors: Etsunori Fujita, Higashihiroshima (JP); Kiyonori Umezaki, Aki-gun (JP); Jun Fukuda, Aki-gun (JP)

(73) Assignee: DELTA KOGYO CO., LTD., Aki-gun (JP)

( * ) Notice: Subject to any disclaimer, the term of this patent is extended or adjusted under 35 U.S.C. 154(b) by 0 days.

(21) Appl. No.: 17/280,688

(22) PCT Filed: Sep. 24, 2019

(86) PCT No.: PCT/JP2019/037210
§ 371 (c)(1),
(2) Date: Mar. 26, 2021

(87) PCT Pub. No.: WO2020/066984
PCT Pub. Date: Apr. 2, 2020

(65) Prior Publication Data
US 2021/0339658 A1 Nov. 4, 2021

(30) Foreign Application Priority Data
Sep. 28, 2018 (JP) .............................. JP2018-186178

(51) Int. Cl.
*B60N 2/235* (2006.01)
(52) U.S. Cl.
CPC .................................. *B60N 2/2358* (2013.01)
(58) Field of Classification Search
CPC .............................. B60N 2/2358; B60N 2/236
(Continued)

(56) References Cited

U.S. PATENT DOCUMENTS 6,007,153 A * 12/1999 Benoit ................. B60N 2/2358
297/363
6,082,821 A * 7/2000 Baloche ............... B60N 2/2358
297/354.12
(Continued)

FOREIGN PATENT DOCUMENTS

JP 2005-350050 A 12/2005
JP 2008-119362 A 5/2008
(Continued)

OTHER PUBLICATIONS

International Search Report dated Nov. 12, 2019 in PCT/JP2019/037210 filed on Sep. 24, 2019, 2 pages.
(Continued)

*Primary Examiner* — Sarah B McPartlin
(74) *Attorney, Agent, or Firm* — Oblon, McClelland, Maier & Neustadt, L.L.P.

(57) ABSTRACT

An internal gear includes a thin annular portion and a thick annular portion whose outside diameters are the same and whose inside diameters are different are continuously provided integrally in an axial direction, and an outer peripheral surface of the thin annular portion and the thick annular portion is formed in a substantially L shape in a flush cross section. Therefore, a conventionally substantially convex section formed with the memory internal teeth does not become the weak point in terms of strength. An axial outer end surface of the thick annular portion of the internal gear is formed to be substantially flat, and the coupling cover member is fixed to the thick annular portion to be coupled to a frame of a seat cushion or a seat back.

4 Claims, 10 Drawing Sheets

(58) Field of Classification Search
USPC .................................................. 297/366, 367
See application file for complete search history.

(56) References Cited

U.S. PATENT DOCUMENTS

| | | | | |
|---|---|---|---|---|
| 7,614,700 | B2* | 11/2009 | Peters ................... | B60N 2/236 |
| | | | | 297/367 P |
| 8,641,145 | B2* | 2/2014 | Schwarze .............. | B60N 2/236 |
| | | | | 297/367 R |
| 10,093,201 | B2* | 10/2018 | Auer .................... | B60N 2/2356 |
| 2008/0048478 | A1 | 2/2008 | Koumura | |
| 2013/0161995 | A1 | 6/2013 | Yamada et al. | |
| 2015/0321585 | A1* | 11/2015 | McCulloch .......... | B60N 2/2356 |
| | | | | 297/367 P |

FOREIGN PATENT DOCUMENTS

| | | |
|---|---|---|
| JP | 2009-226039 A | 10/2009 |
| JP | 2012-143508 A | 8/2012 |

OTHER PUBLICATIONS

Written Opinion of the International Searching Authority dated Nov. 12, 2019 in PCT/JP2019/037210 filed on Sep. 24, 2019, 4 pages (with partial translation).

* cited by examiner

Fig. 10

RECLINING DEVICE AND SEAT

TECHNICAL FIELD

The present invention relates to a reclining device attached to a seat of a vehicle or the like to appropriately adjust an angle of inclination of a seat back with respect to a seat cushion, and a seat in which the seat reclining device is assembled.

BACKGROUND ART

A reclining device is formed so as to fix a guide bracket to one of a seat cushion and a seat back, fix an internal gear to the other, dispose lock plates including external teeth engageable with internal teeth of the internal gear between the guide bracket and the internal gear, keep the seat back at an appropriate angle of inclination by making the internal gear and the lock plates engaged with each other, and allow the seat back to turn forward and backward by releasing their engagement. Further, as indicated in Patent Documents 1 and 2, in a case where a seat back is moved to a forward reclined position by a walk-in operation or the like, there is also known a reclining device including a memory mechanism part which allows a reclining angle of the seat back at a position before the walk-in operation to be memorized, and the seat back to be returned to the memorized inclination position at the time of a return from the walk-in operation.

PRIOR ART DOCUMENT

Patent Document

Patent Document 1: Japanese Patent Application Laid-open No. 2008-119362
Patent Document 2: Japanese Patent Application Laid-open No. 2009-226039

SUMMARY OF THE INVENTION

Problems to be Solved by the Invention

The reclining devices disclosed in Patent Documents 1 and 2 each include, in addition to a normal lock mechanism part for locking the seat back at a predetermined reclining angle, the above-described memory mechanism part, and an internal gear includes not only locking internal teeth engageable with lock plates at the time of normal locking but also memory internal teeth engageable with a memory gear at the time of a memory operation. The locking internal teeth and the memory internal teeth are continuously provided while having a step in an axial direction. That is, the internal gear is formed in a substantially convex shape including, on an outer end side in the axial direction, a small-diameter portion whose inside diameter and outside diameter are both small and in which the memory internal teeth are formed on an inner peripheral surface, and including, adjacently to the small-diameter portion in the axial direction, a large-diameter portion whose inside diameter and outside diameter are both larger than those of the small-diameter portion and in which the locking internal teeth are formed on an inner peripheral surface. The small-diameter portion and the large-diameter portion, whose inside diameters and outside diameters are both different in this manner, are each normally processed by fine blanking processing so that both the inner peripheral surface and an outer peripheral surface have a stepped shape. The small-diameter portion is a section fixed to a frame of a seat cushion or a seat back, and a load of the frame is directly transmitted thereto, thus bringing about a weak point in terms of strength which makes deformation likely to occur. However, conventionally, although there is a point where the memory internal teeth are formed on the inner peripheral surface of the small-diameter portion having a case where operations of members composing the memory mechanism part are not smoothly performed and a size of the small-diameter portion is restricted when it is fixed by welding, a deformation of the frame also makes the outside diameter of the small-diameter portion small, which easily causes the deformation when a large load is applied to either of the memory internal teeth and the locking internal teeth. Further, the welding compels the small-diameter portion to have a shape in which a convex portion not subjected to heat treatment is formed at its further axial outer end (refer to Patent Document 2), and in that case, a diameter of the convex portion becomes small, and along with this, a coupled range to the frame becomes small, which also affects the strength. Further, both the complicated shapes sometimes make flatness on a stepped surface between the large-diameter portion and the small-diameter portion unlikely to be secured, and sometimes affect smooth operations of the respective members.

The present invention was made in consideration of the above, and has an object to provide a reclining device which enhances strength of an internal gear including locking internal teeth and memory internal teeth and is capable of inhibiting deformation when a large load is applied to each of the locking internal teeth and the memory internal teeth, and in which forming the internal gear in a simple shape also makes flatness on a stepped surface between the locking internal teeth and the memory internal teeth likely to be secured to enable further smooth operations of members, and a seat having the reclining device.

Means for Solving the Problems

In order to solve the above problems, a reclining device of the present invention includes:
a lock mechanism part including a guide bracket coupled to one of a seat cushion and a seat back, and including lock plates movable in a radial direction along a plurality of guide wall portions provided on one surface of the guide bracket;
an internal gear which is coupled to the other of the seat cushion and the seat back, and rotates relatively to the guide bracket; and
a memory mechanism part which includes memory gears provided between the guide bracket and the internal gear, and memorizes a predetermined locked position through the lock mechanism part,
wherein, in the internal gear, a thin annular portion and a thick annular portion whose outside diameters are same and whose inside diameters are different are continuously provided integrally in an axial direction, and an axial outer end surface of the thick annular portion is formed to be substantially flat, and
wherein, on an inner peripheral surface of the thin annular portion, locking internal teeth with which locking external teeth provided on the lock plate engage are formed, and on an inner peripheral surface of the thick annular portion, memory internal teeth with which memory external teeth provided on the memory gear engage are formed.

Preferably, a coupling cover member coupled to the seat cushion or the seat back is fixed so as to project to an outside of the axial outer end surface of the thick annular portion of the internal gear.

Preferably, a projecting pin projecting in the memory gear direction is provided on the lock plate, the projecting pin is inserted through a pin insertion hole with a predetermined length which is provided along a circumferential direction in the memory gear, and the projecting pin moves relatively in the pin insertion hole at a time of a rotation of the memory gear, whereby the lock plate is held in a memory position.

Preferably, the projecting pin is provided with a flange portion at one end of a shaft portion, the guide bracket has a pin restricting hole which is formed long in a radial direction so as to allow the projecting pin to move in the radial direction together with the lock plate, and whose width along a direction orthogonal to the radial direction is formed to be almost same as a diameter of the shaft portion of the projecting pin, the projecting pin is inserted in the pin restricting hole of the guide bracket from an axial outer end side of the guide bracket, a tip of the shaft portion penetrates the lock plate to project, and the flange portion is located on the axial outer end side of the guide bracket, and the shaft portion of the projecting pin is restricted by the pin restricting hole, and can move in the radial direction with wobbling in the direction orthogonal to the radial direction of the lock plate reduced.

Preferably, the shaft portion of the projecting pin is integrated with the lock plate.

Further, the present invention provides a seat which includes a seat cushion and a seat back, the seat including the reclining device.

Effect of the Invention

According to the present invention, in the internal gear, the thin annular portion and the thick annular portion whose outside diameters are the same and whose inside diameters are different are continuously provided integrally in the axial direction, and the outer peripheral surface of the thin annular portion and the thick annular portion is formed in a substantially L shape in a flush cross section. Therefore, a conventionally substantially convex section formed with the memory internal teeth does not become the weak point in terms of strength. Further, in the present invention, since the axial outer end surface of the thick annular portion of the internal gear is formed to be substantially flat, the coupling cover member is fixed to this thick annular portion to be coupled to the frame of the seat cushion or the seat back. Since the coupling can be performed with the thick annular portion interposed, high coupling strength can be obtained. Further, since the internal gear is in the substantially L shape in the cross section as described above, the shape is simple, which also makes the stepped surface between the thick annular portion and the thin annular portion likely to secure high smoothness.

BRIEF DESCRIPTION OF DRAWINGS

FIG. 1(a) is a perspective view from a coupling cover member side, and FIG. 1(b) is a perspective view from a mounting ring side.

MODES FOR CARRYING OUT THE INVENTION

The present invention will be hereinafter described in more detail based on embodiments illustrated in the drawings. FIG. 1 to FIG. 5 illustrate a reclining device 10 according to one embodiment of the present invention. The reclining device 10 is attached between a cushion frame 1 of a seat cushion and a back frame 2 of a seat back, and reclines the seat back with respect to the seat cushion (refer to FIG. 8). As illustrated in FIG. 1 to FIG. 5, the reclining device 10 includes a lock mechanism part 20, a memory mechanism part 30, and an internal gear 40.

The lock mechanism part 20 has a guide bracket 21 and lock plates 22. For the guide bracket 21, on its inner surface (a surface opposing the internal gear 40), four guide wall portions 21a, 21a are projectingly provided at equal intervals in a circumferential direction, and the lock plates 22, 22 are each disposed between the adjacent guide wall portions 21a, 21a. The lock plates 22, 22 are each disposed between the guide wall portions 21a, 21a located at 180-degree symmetrical positions in this embodiment. The lock plates 22, 22 are formed with locking external teeth 22a, 22a on outer peripheral surfaces, and are each movable in a radial direction between the guide wall portions 21a, 21a, and the locking external teeth 22a, 22a move outward and engage with locking internal teeth 411 formed on the later-described internal gear 40 to thereby perform locking.

An unlocking cam 23 is disposed between the two lock plates 22, 22, and spiral springs 24, 24 are disposed at two portions each between the guide wall portions 21a, 21a where the lock plates 22, 22 are not disposed. The spiral springs 24, 24, in each of which one end is engaged with the unlocking cam 23, bias the unlocking cam 23 in a direction in which it is rotated in one direction. That causes the lock plates 22, 22 with which the unlocking cam 23 is engaged to be biased radially outward, namely, in a direction of engaging with the locking internal teeth 411 of the internal gear 40. Through a center hole 23a of the unlocking cam 23, a lever shaft 25 connected to a reclining operating lever (not illustrated) is inserted, and by rotating the lever shaft 25 in a predetermined direction, the unlocking cam 23 is rotated in the reverse direction to the biased direction, which pulls the lock plates 22, 22 radially inward to separate the locking external teeth 22a, 22a and the locking internal teeth 411, resulting in unlocking.

Figure 8:
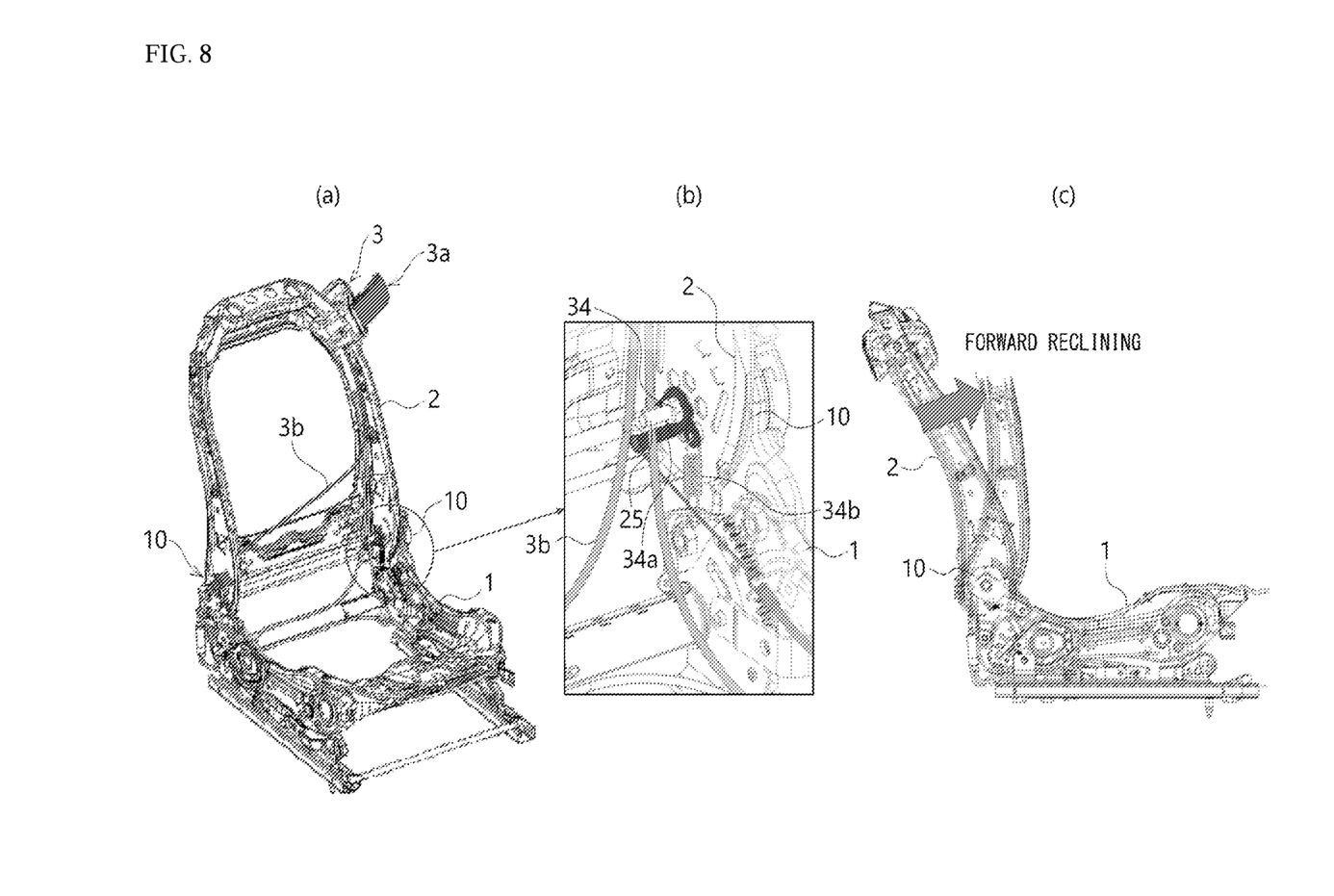
FIG. 8(a) is an explanatory view of a walk-in mechanism provided for a back frame and a cushion frame.
FIG. 8(b) is a view illustrated by enlarging an area to which the reclining device in FIG. 8(a) is attached.
FIG. 8(c) is a view illustrating a movement when the back frame is reclined forward.

The memory mechanism part 30 is provided between the lock mechanism part 20 and the internal gear 40. The memory mechanism part 30 has a memory cam 31, memory gears 32, 32, a memory guide plate 33, and a cylindrical shaft portion 34. The memory cam 31, whose outer periphery has a disc shape in this embodiment, is also responsible for a function of a partition wall portion between the lock mechanism part 20 and the memory gears 32, 32. Around a through hole 31b at the center, cam portions 31a, 31a projecting to the internal gear 40 side are formed in plurality. Note that, coaxially with the through hole 31b, a cylindrical shaft portion 34 is integrated so as to project to the internal gear 40 side. As illustrated in FIG. 8, the cylindrical shaft portion 34 is provided so as to project to the inside of the back frame 2, and a coupling plate 34a is coupled to a section where the cylindrical shaft portion 34 projects inward. The coupling plate 34a is engaged with the other end of a coil spring 34b whose one end is engaged with the seat frame 1, to be biased in a direction of the seat frame 1. This causes the cylindrical shaft portion 34 to be biased constantly in one direction, and this direction becomes a biased direction of the memory cam 31, namely, a direction in which memory external teeth 32b, 32b of the memory gears 32, 32 separate from memory internal teeth 421 of the internal gear 40. The coupling plate 34a is coupled to a walk-in lever 3a composing a walk-in mechanism 3 with a cable 3b interposed therebetween, and is rotated in the reverse direction to the above-described biased direction by operating the walk-in lever 3a.

The memory gears 32, 32 are formed from two sheets of plate material formed in a substantially arc shape, and are provided at 180-degree symmetrical positions sandwiching the cylindrical shaft portion 34 adjacently to the internal gear 40 side of the memory cam 31. Further, the two cam portions 31a, 31a of the memory cam 31 are disposed with a space accessible to inner peripheral edges 32a, 32a of the respective memory gears 32, 32. The memory external teeth 32b, 32b are formed on outer peripheral surfaces of the memory gears 32, 32, and the inner peripheral edges 32a, 32a are pressed outward by the cam portions 31a, 31a, whereby the memory external teeth 32b, 32b engage with the memory internal teeth 421 of the internal gear 40.

Figure 4:
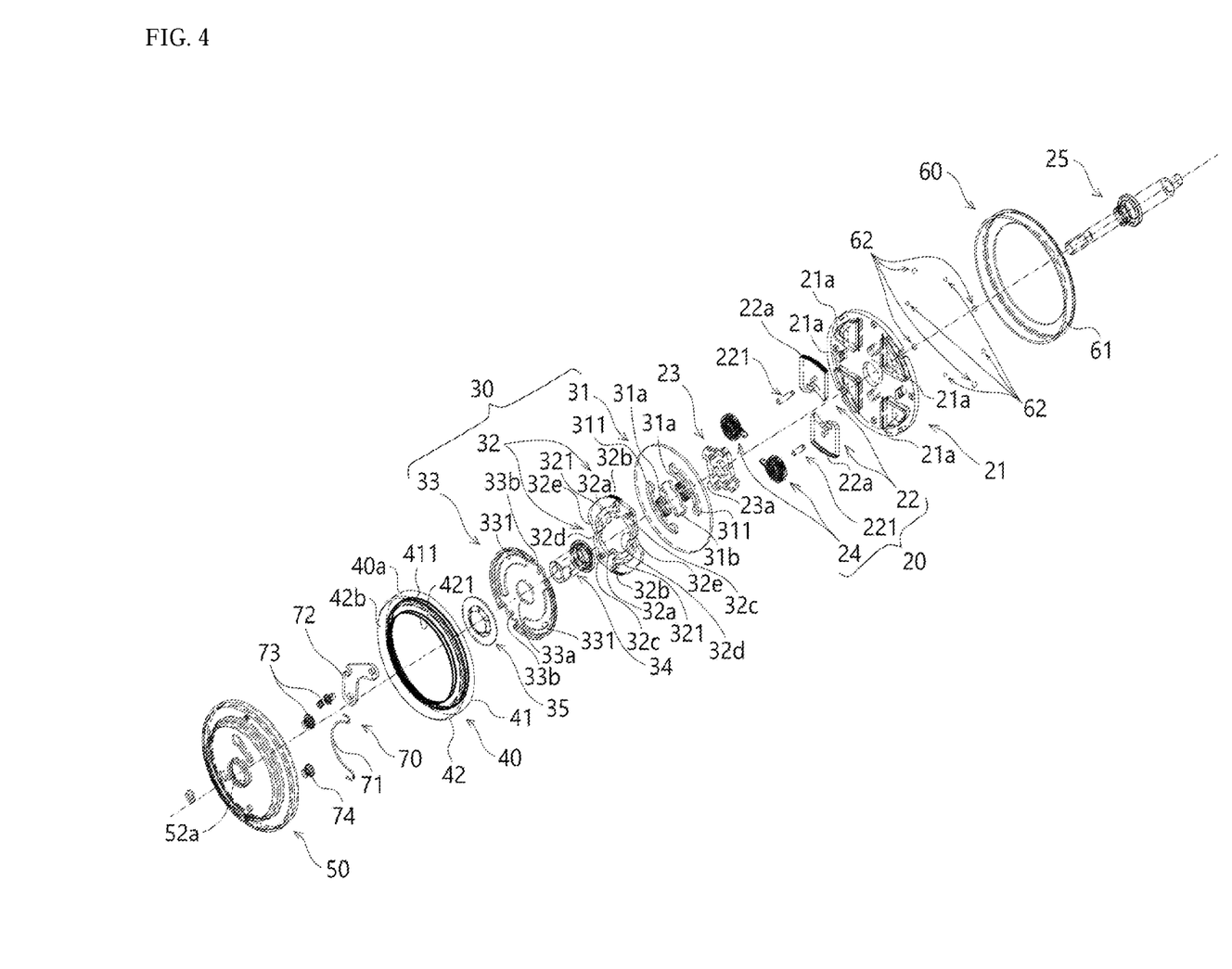
FIG. 4 is an exploded perspective view illustrated by further dividing the lock mechanism part and the memory mechanism part in FIG. 3 for each part.
Figure 5:
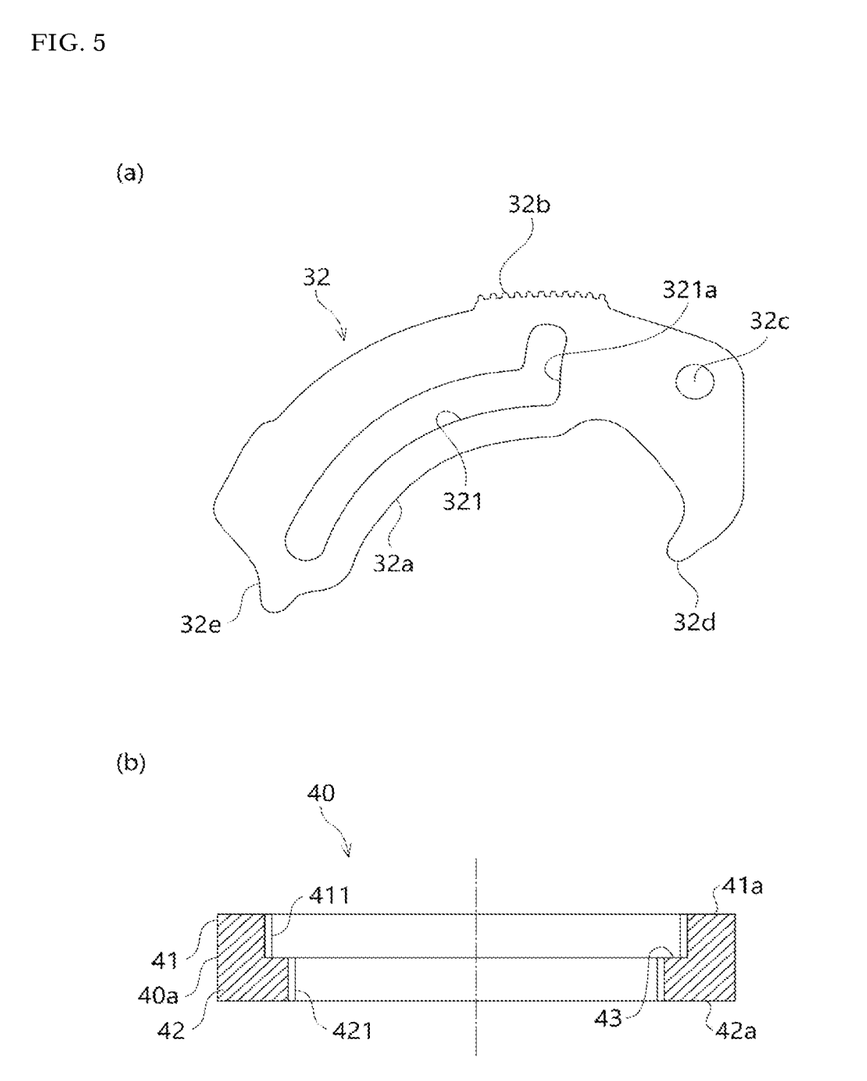
FIG. 5(a) is a plane view illustrating a memory gear.
FIG. 5(b) is a sectional view illustrating the internal gear.

The memory guide plate 33 has a through hole 33a through which the cylindrical shaft portion 34 is inserted at the center, and is formed with hole portions 33b, 33b each having a small diameter at 180-degree symmetrical positions close to an outer peripheral edge. In the hole portions 33b, 33b each having a small diameter, projecting portions 32c, 32c formed on the memory gears 32, 32 respectively so as to project to the internal gear 40 side are fitted to be assembled. This allows the memory gears 32, 32 to rotationally move with the projecting portions 32c, 32c centered as illustrated in FIG. 4 and FIG. 5(a). One-end-side end wall portions 32d, 32d extending inward are provided at circumferential one ends of the memory gears 32, 32, and the projecting portions 32c, 32c are provided slightly closer to circumferential other ends than the one-end-side end wall portions 32d, 32d. The memory cam 31 is biased in one direction so that the cam portions 31a, 31a abut on the one-end-side end wall portions 32d, 32d. The memory cam 31 is integrated with the cylindrical shaft portion 34, and is biased constantly in one direction by the above-described coil spring 34b via the cylindrical shaft portion 34. This causes the memory gears 32, 32 to have other ends 32e, 32e of the memory gears 32, 32 biased inward with the projecting portions 32c, 32c centered, and causes the memory external teeth 32b, 32b to separate from the memory internal teeth 421 of the internal gear 40. When the seat back (back frame 2) is reclined forward by operating the walk-in lever 3a of the walk-in mechanism 3, the memory cam 31 rotates in the reverse direction, and the cam portion 31a, 31a press the inner peripheral edges 32a, 32a of the memory gears 32, 32 outward, whereby the memory external teeth 32b, 32b engage with the memory internal teeth 421 of the internal gear 40 (refer to FIG. 7).

Further closer to the internal gear 40 side of the memory guide plate 33, a nut member 35 is mounted around the cylindrical shaft portion 34 projecting from the through hole 33a. This causes the memory mechanism part 30 including the memory cam 31, the memory gears 32, 32, the memory guide plate 33, the cylindrical shaft portion 34, and the nut member 35 to be integrated to form a unit.

Here, in any of the memory cam 31, the memory gears 32, 32, and the memory guide plate 33, substantially arc-shaped pin insertion holes 311, 321, 331 are formed respectively at 180-degree symmetrical positions sandwiching the cylindrical shaft portion 34.

Among them, the pin insertion holes 321, 321 formed in the memory gears 32, 32 are formed with long groove portions 321a, 321a extending in outer peripheral edge directions of the memory gears 32, 32 respectively on circumferential one end sides as illustrated in FIG. 5(a). In the pin insertion holes 321, 321 of the memory gears 32, 32, projecting pins 221, 221 made to project to the internal gear 40 side on the lock plates 22, 22 are inserted, and the projecting pins 221, 221 are provided in a positional relationship in which at a locked position of the lock plates 22, 22, the projecting pins 221, 221 are inserted in the long groove portions 321a, 321a, and at the time of a walk-in operation, after releasing the engagement of the locking external teeth 22a, 22a of the lock plates 22, 22 with the locking internal teeth 411 of the internal gear 40, when the memory gears 32, 32 rotate together with the internal gear 40, the projecting pins 221, 221 relatively move from the long groove portions 321a, 321a toward circumferential other end sides in the pin insertion holes 321, 321.

In the memory cam 31 provided between the lock plates 22, 22 and the memory gears 32, 32, when the memory cam 31 is rotated in one direction together with the cylindrical shaft portion 34, and, when the memory gears 32, 32 rotate in the other direction together with the internal gear 40 after unlocking, the projecting pins 221, 221 are provided in a relatively movable range in the pin insertion holes 311, 311 of the memory cam 31. Further, at least when the projecting pins 221, 221 are located in the long groove portions 321a, 321a, the pin insertion holes 311, 311 are each provided in a shape having a section with a groove width allowing movement in the radial direction.

The memory guide plate 33 rotates together with the memory gears 32, 32 since the hole portions 33b, 33b are fitted to the projecting portions 32c, 32c of the memory gears 32, 32. Accordingly, its pin insertion holes 331, 331 are formed at least at positions corresponding to the pin insertion holes 321, 321 of the memory gears 32, 32, and formed with a width allowing the movement of the projecting pins 221, 221 in the radial direction of the long groove portions 321a, 321a. Note that memory operation of the memory mechanism part 30 is described later.

Figure 1:
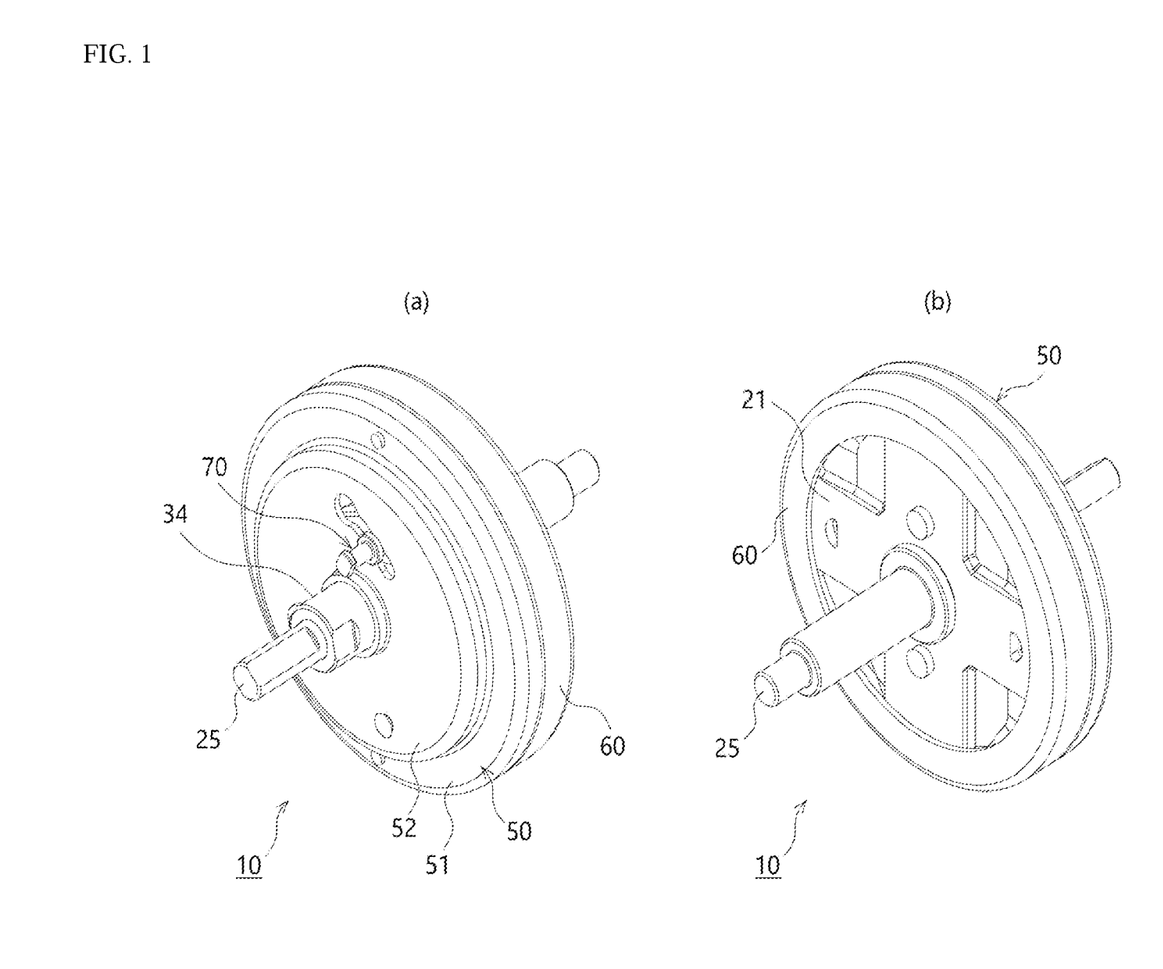
FIG. 1 each illustrate an external appearance of a reclining device according to one embodiment of the present invention.
Figure 2:
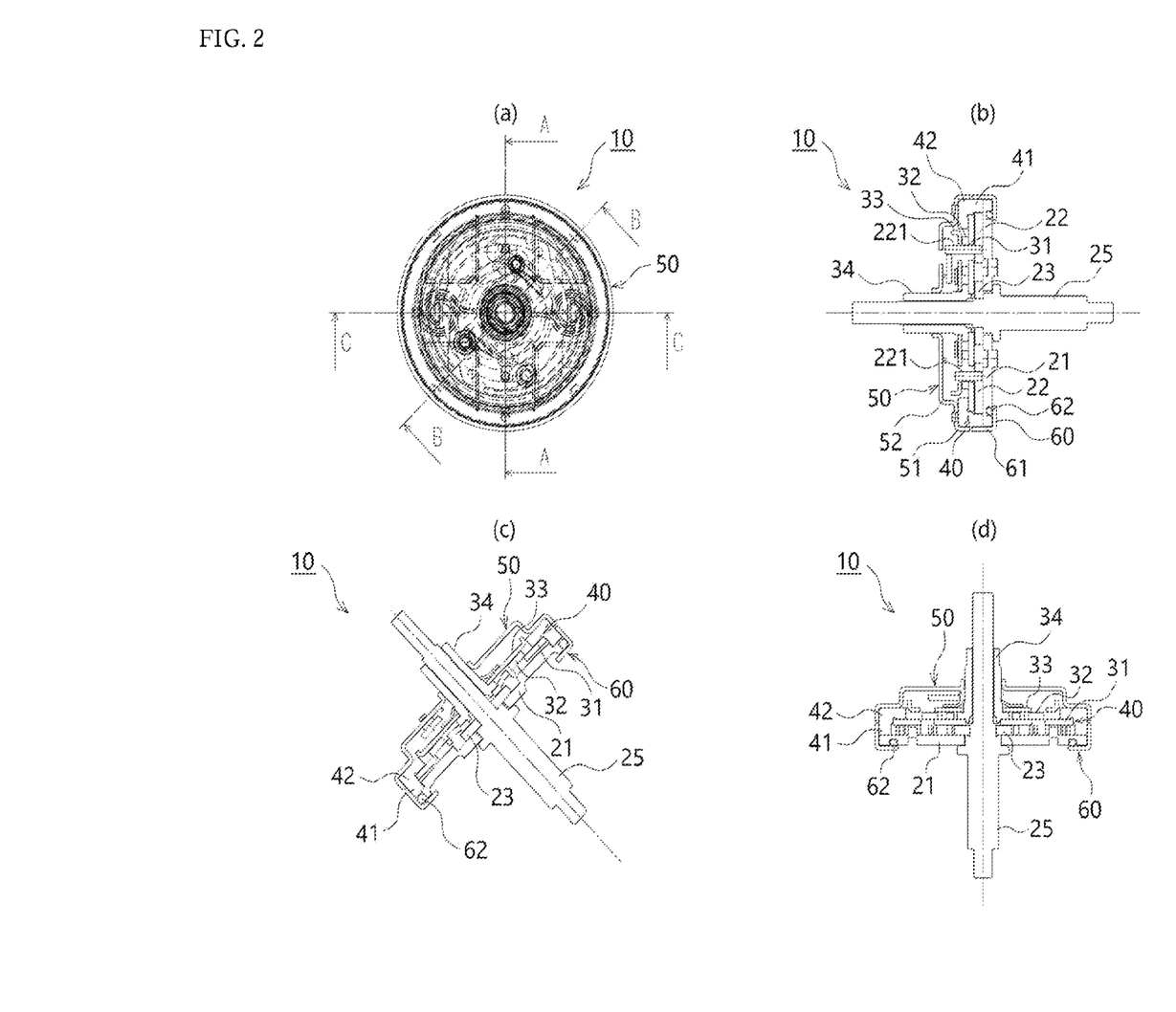
FIG. 2(a) is a plane view of the reclining device of the above-described embodiment.
FIG. 2(b) is a sectional view taken along the A-A line in FIG. 2(a)
FIG. 2(c) is a sectional view taken along the B-B line in FIG. 2(a)
FIG. 2(d) is a sectional view taken along the C-C line in FIG. 2(a).
Figure 3:
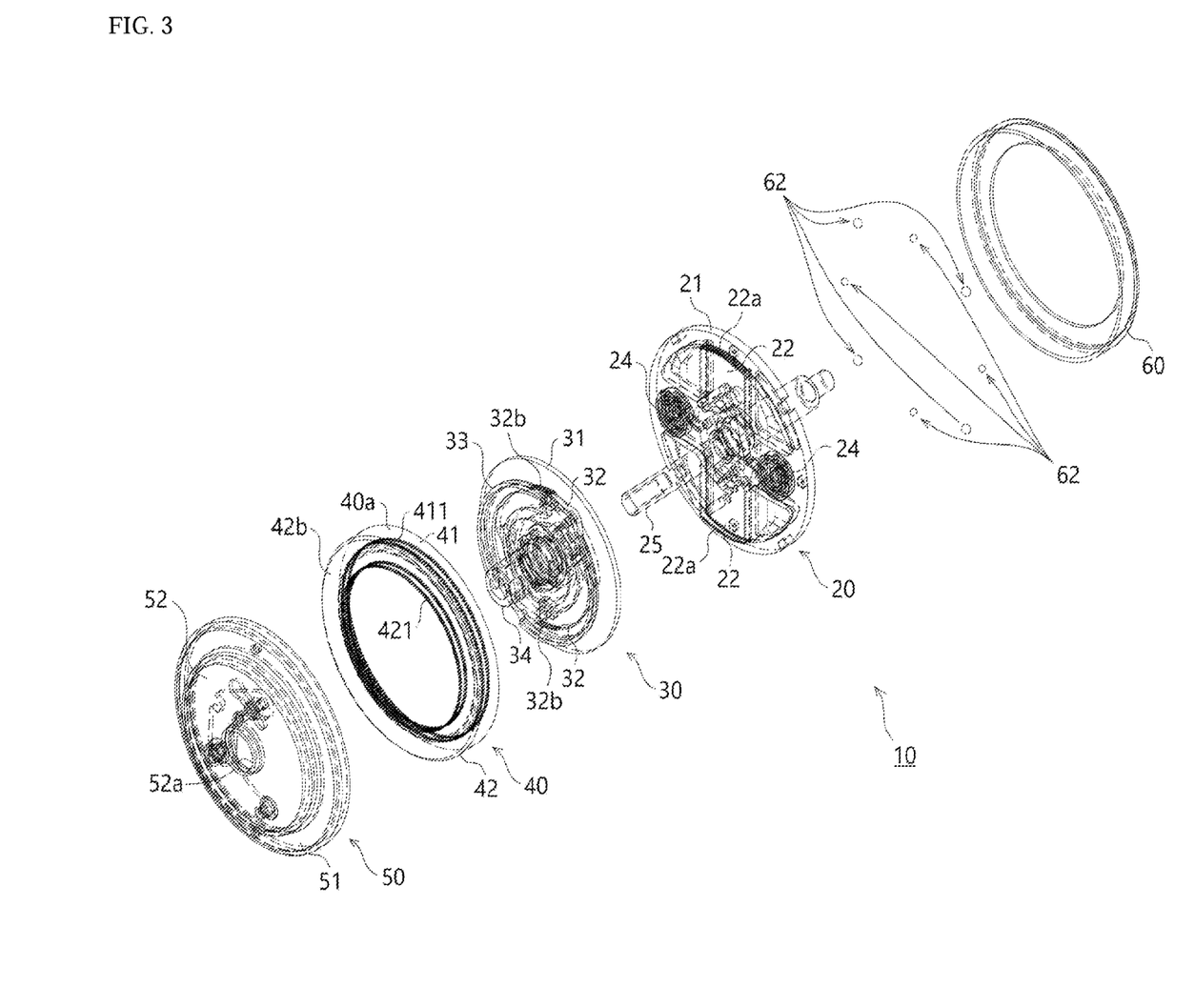
FIG. 3 is an exploded perspective view illustrated by dividing the reclining device of the above-described embodiment into a mounting ring, a lock mechanism part, a memory mechanism part, an internal gear, and a coupling cover member.

In the internal gear 40, as illustrated in FIG. 3, FIG. 4, and FIG. 5(b), a thin annular portion 41 and a thick annular portion 42 whose outside diameters are the same and whose inside diameters are different are continuously provided integrally in the axial direction. The thin annular portion 41 is on an end side opposed to the guide bracket 21 along the axial direction, and the thick annular portion 42 is on an end edge side opposite to the thin annular portion 41. The same outside diameters cause an outer peripheral surface of the thin annular portion 41 and an outer peripheral surface of the thick annular portion 42 to be a flush outer peripheral surface 40a, whose cross-sectional shape is in a substantially L shape. Further, an axial outer end surface 42a of the thick annular portion 42 is formed to be substantially flat.

Then, on an inner peripheral surface of the thin annular portion 41, the locking internal teeth 411 with which the locking external teeth 22a, 22a of the lock plates 22, 22 are engageable are formed, and on an inner peripheral surface of the thick annular portion 42, the memory internal teeth 421 with which the memory external teeth 32b, 32b of the memory gears 32, 32 are engageable are formed.

In this embodiment, since the internal gear 40 only needs to be processed to have the substantially L-shaped cross-sectional shape, the flatness of a stepped surface 43 between the locking internal teeth 411 being the inner peripheral surface of the thin annular portion 41 and the memory internal teeth 421 being the inner peripheral surface of the thick annular portion 42 is easy to highly process, differently from the case where an internal gear is formed to be in a conventional convex shape. This enables a smooth rotational operation of the lock mechanism part 20 or the memory mechanism part 30.

A coupling cover member 50 is provided so as to project outward from the axial outer end surface 42a of the thick annular portion 42 of the internal gear 40. The coupling cover member 50 is in a substantially convex shape in a cross section having a large-diameter portion 51 and a small-diameter portion 52, and the large-diameter portion 51 is welded on the outer peripheral surface close to the thick annular portion 42 of the outer peripheral surface 40a of the internal gear 40. A section formed with the memory internal teeth 421 with which the memory gears 32, 32 engage is the thick annular portion 42 provided with a predetermined thickness. In a conventional internal gear, an axial outer end side of a small-diameter portion is set as a range where memory internal teeth are not formed, or a coupling plate portion having a smaller diameter is formed on the axial outer end side (refer to Patent Document 2), to be coupled to a back frame or a cushion frame, but in this embodiment, the section formed with the memory internal teeth 421 has the predetermined thickness, and the section itself formed with the memory internal teeth 421 is higher in strength as compared with the conventional one. Therefore, in the internal gear 40 of this embodiment, deformation strength against external force is naturally high, and when the memory internal teeth 421 are subjected to heat treatment to have high surface hardness, the vicinity of the outer peripheral surface of the thick annular portion 42 is unlikely to be affected by the heat treatment, which allows the coupling cover member 50 to be easily welded. Further, since the thick annular portion 42 has sufficient strength, the coupling cover member 50 having a conversely small plate thickness is enough for the one integrated with the thick annular portion 42, also thereby improving processability at the time of welding.

Here, as the heat treatment for hardening surfaces of the locking internal teeth 411 and the memory internal teeth 421 of the internal gear 40, induction heating is preferably used. The induction heating allows only the vicinities of the locking internal teeth 411 and the memory internal teeth 421 to be partially heated. When the induction heating is performed, a heating unit may be confronted with the locking internal teeth 411 and the memory internal teeth 421, but the heating may be performed from surfaces being different from those of the locking internal teeth 411 and the memory internal teeth 421 and excluding the outer peripheral surface 40a on which the coupling cover member 50 and a later-described mounting ring 60 are welded. For example, it is possible to heat a section close to the inside diameter of an axial inner end surface 41a of the thin annular portion 41 and to adjust a frequency to have an influence of heat on a section up to the locking internal teeth 411. Similarly, it is possible to heat a section close to the inside diameter of the axial outer end surface 42a of the thick annular portion 42 to have an influence of heat on the memory internal teeth 421. Using such a heating method makes it possible to inhibit the surfaces of the locking internal teeth 411 and the memory internal teeth 421 from becoming rough, resulting in allowing the surfaces of the teeth to have high surface accuracy.

The memory mechanism part 30 is disposed adjacently to the internal gear 40 side of the above-described lock mechanism part 20, and the lever shaft 25 of the lock mechanism part 20 is assembled so as to be inserted through into the cylindrical shaft portion 34 of the memory mechanism part 30, and the memory mechanism part 30 and the lock mechanism part 20 are inserted into the internal gear 40 in that order to confront the memory external teeth 32b, 32b of the memory gears 32, 32 with the memory internal teeth 421 formed on the thick annular portion 42 and to confront the locking external teeth 22a, 22a of the lock plates 22, 22 with the locking internal teeth 411 formed on the thin annular portion 41.

Next, through a center through hole 52a formed in the small-diameter portion 52 of the coupling cover member 50, the cylindrical shaft portion 34 through which the lever shaft 25 is inserted is inserted. Meanwhile, from the axial outer end surface side in the guide bracket 21 of the lock mechanism part 20, the mounting ring 60 for holding the lock mechanism part 20 and the memory mechanism part 30 in an assembled state is mounted with balls 62 interposed therebetween. Thereafter, the large-diameter portion 51 of the coupling cover member 50 is welded on the outer peripheral surface close to the thick annular portion 42 of the outer peripheral surface 40a of the internal gear 40, and a peripheral wall portion 61 of the mounting ring 60 is welded and fixed on the outer peripheral surface close to the thin annular portion 41 of the outer peripheral surface of the internal gear 40.

Figure 6:
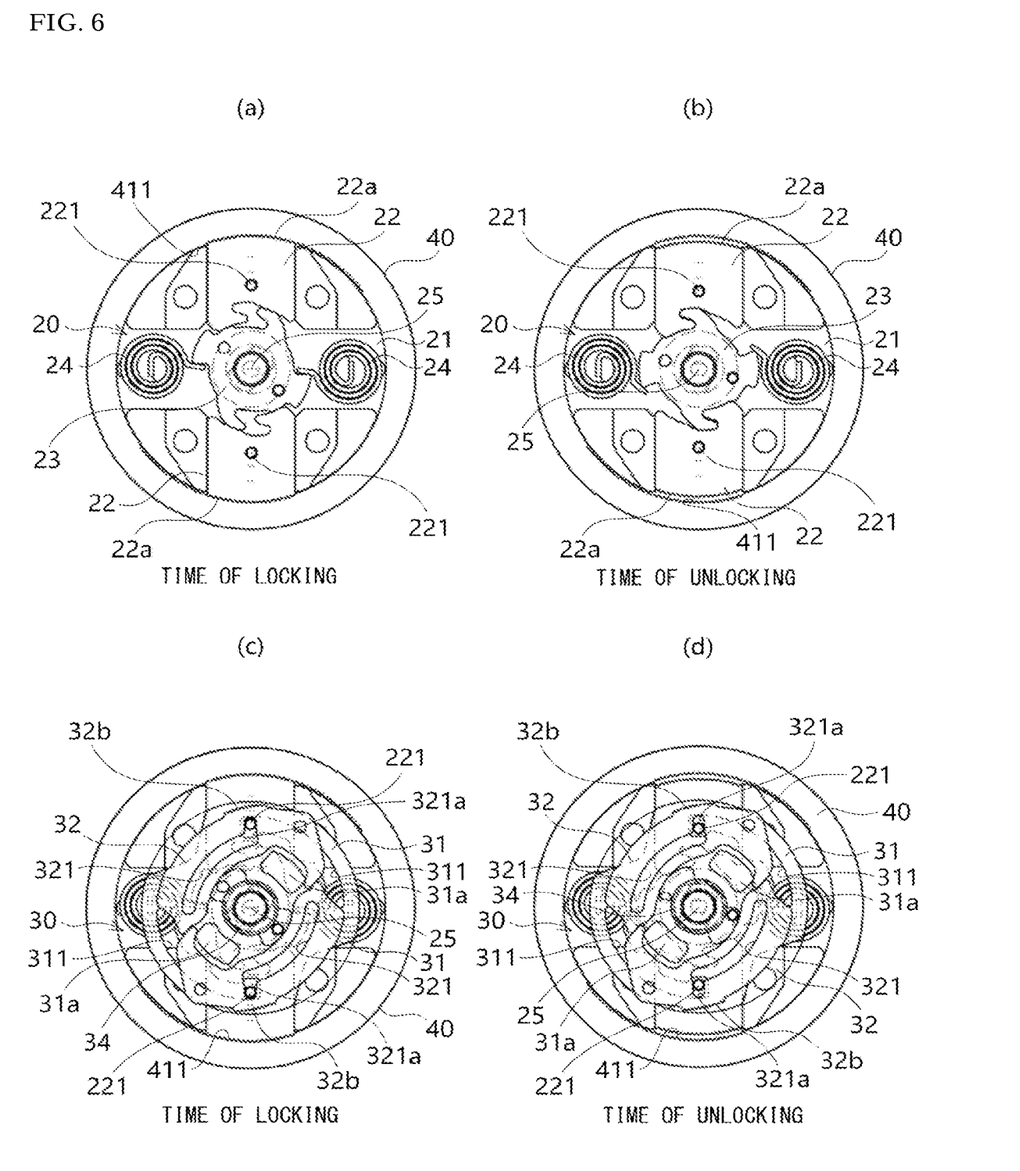
FIG. 6(a) is an explanatory view of the action of the lock mechanism part at the time of locking.
FIG. 6(b) is an explanatory view of the action of the lock mechanism part at the time of unlocking.
FIG. 6(c) is a view illustrating a state of the memory mechanism part at the time of locking the lock mechanism part.
FIG. 6(d) is a view illustrating a state of the memory mechanism part at the time of unlocking the lock mechanism part.
Figure 7:
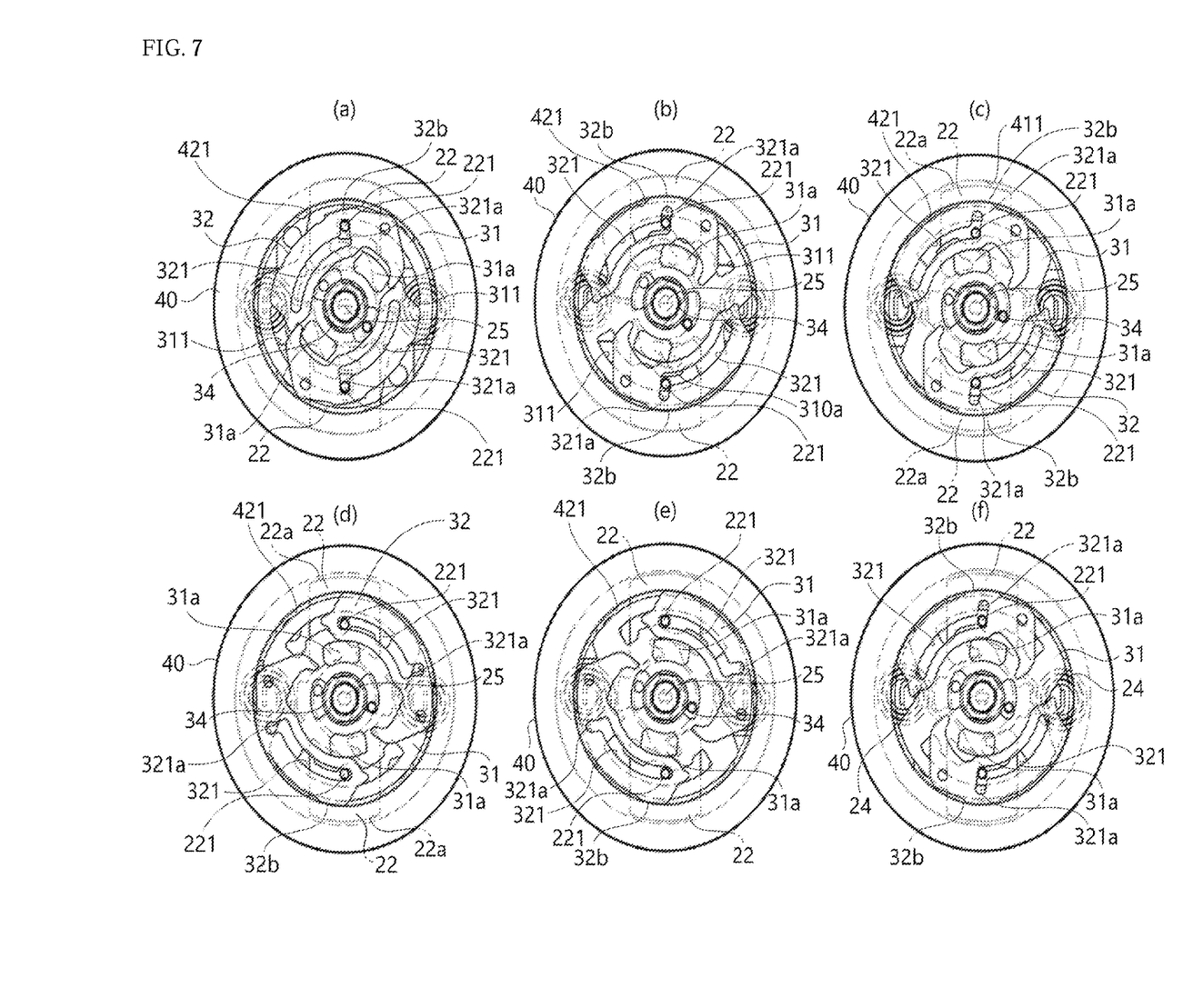
FIGS. 7(a) to (f) are explanatory views of the action of the memory mechanism part.

Next, a movement of the reclining device 10 of this embodiment is described. Before a normal reclining operation, in the lock mechanism part 20, as illustrated in FIG. 6(a), the lock plates 22, 22 are biased outward by the spiral springs 24, 24, and the locking external teeth 22a, 22a engage with the locking internal teeth 411 of the internal gear 40. This causes the seat back to have a predetermined reclining angle maintained. When the reclining operation is performed, the lever shaft 25 is rotated by operating the reclining operating lever. As illustrated in FIG. 6(b), this causes the unlocking cam 23 to move the lock plates 22, 22 inward to release the engagement of the locking external teeth 22a, 22a and the locking internal teeth 411, which enables reclining of the seat back. When the operation of the reclining operating lever is stopped at a predetermined angle, the lock plates 22, 22 are moved outward by the spiral springs 24, 24, and the locking external teeth 22a, 22a and the locking internal teeth 411 engage with each other, resulting in fixing the reclining angle, as illustrated in FIG. 6(a) again. Note that since the lever shaft 25 rotates in the cylindrical shaft portion 34 of the memory mechanism part 30, the memory mechanism part 30 does not operate at the time of this normal reclining operation (refer to FIGS. 6(a), (b)).

Meanwhile, when the seat back is reclined forward at the time of the walk-in operation, the walk-in lever 3a illustrated in FIG. 8(a) is operated. Operating the walk-in lever 3a makes the coupling plate 34a rotate in the reverse direction to a biasing direction of the coil spring 34b via the cable 3b, which rotates the cylindrical shaft portion 34. When the cylindrical shaft portion 34 rotates, a state in FIG. 7(a) becomes a state in FIG. 7(b), and the memory cam 31 integrated with the cylindrical shaft portion 34 rotates in a direction of the other ends 32e, 32e of the memory gears 32, 32. This rotation causes the cam portions 31a, 31a to push the inner peripheral edges 32a, 32a of the memory gears 32, 32 outward and causes the memory external teeth 32b, 32b of the memory gears 32, 32 to engage with the memory internal teeth 421 of the internal gear 40.

In the state where the memory mechanism part 30 does not operate, as illustrated in FIG. 7(a), the projecting pins 221, 221 of the lock plates 22, 22 are located in the long groove portions 321a, 321a of the pin insertion holes 321, 321 in the memory gears 32, 32. When the other ends 32e, 32e of the memory gears 32, 32 are pushed outward by the rotation of the memory cam 31, first, the projecting pins 221, 221 move relatively inward in the long groove portions 321a, 321a in just the state where the lock plates 22, 22 engage with the locking internal teeth 411 of the internal gear 40, namely, with a locked state maintained, as illustrated in FIG. 7(b).

Thereafter, when the memory cam 31 is further rotated, the projecting pins 221, 221 move further inward in the long groove portions 321a, 321a, and the locking external teeth 22a, 22a of the lock plates 22, 22 separate from the locking internal teeth 411 of the internal gear 40, resulting in unlocking, as illustrated in FIG. 7(c). Then, the seat back is reclined forward by the spiral spring which biases the back frame 2 with respect to the cushion frame 1 constantly in a forward reclining direction (refer to FIG. 8(c)). At this time, a state in FIG. 7(c) becomes a state in FIG. 7(d), and the internal gear 40 fixed to the back frame 2 with the coupling cover member 50 interposed therebetween rotates forward. Since the memory gears 32 engage with the memory internal teeth 421 of the internal gear 40, the memory mechanism part 30 also rotates forward together with the internal gear 40. A rotation angle is the angle at which the projecting pins 221, 221 rotate relatively up to the circumferential other end sides in the pin insertion holes 321, 321. During the rotation, since the lock plates 22, 22 and the projecting pins 221, 221 are in an unlocked state, they hold the positions before the walk-in operation without rotating together with the internal gear 40.

At the forward reclined position, the position is held by a forward-reclining locking portion 70 having a spring 71, a fixing plate 72, a shaft 73, a rivet 74, and so on illustrated in FIG. 4. At the time of a return after the walk-in operation, the forward-reclining locking portion 70 is unlocked by operating the walk-in lever 3a. When the seat back is returned backward, the internal gear 40 rotates backward. As illustrated in FIG. 7(e), since the memory external teeth 32b, 32b of the memory gears 32, 32 engage with the memory internal teeth 421 of the internal gear 40, the memory gears 32, 32 rotate backward together with the internal gear 40. Thereafter, the projecting pins 221, 221 of the lock plates 22, 22 holding the position before the walk-in operation (memory position) are moved relatively to the one end sides in the pin insertion holes 321, 321 by the backward rotation of the memory gears 32, 32, and reach positions corresponding to the long groove portions 321a, 321a as illustrated in FIG. 7(f). When the projecting pins 221, 221 correspond to the long groove portions 321a, 321a, the projecting pins 211, 211 can move radially outward in the long groove portions 321a, 321a. That causes, the lock plates 22, 22 biased constantly outward by the spiral springs 24, 24 to move radially outward and return to the state in FIG. 7(a), the locking external teeth 22a, 22a to engage with the locking internal teeth 411 of the internal gear 40 at the memory position, and the seat back to return to the predetermined reclining angle at the memory position before the walk-in operation. Note that when the locking external teeth 22a, 22a engage with the locking internal teeth 411 of the internal gear 40, the memory cam 31 of the memory mechanism part 30 is returned to an original position by biasing force of the coil spring 34b to separate the memory external teeth 32b, 32b of the memory gears 32, 32 from the memory internal teeth 421 of the internal gear 40.

Incidentally, in the above-described embodiment, in the memory mechanism part 30, the memory gears 32, 32 are sandwiched and held by the disk-shaped memory cam 31 integrated with the cylindrical shaft portion 34 and the memory guide plate 33, and they are formed as a unit by the nut member 35. Accordingly, using the one having such a structure as to be formed as a unit as the memory mechanism part 30 enables easy replacement with one having a different internal structure and makes it easy to variously adjust the function of the reclining device 10.

Figure 9:
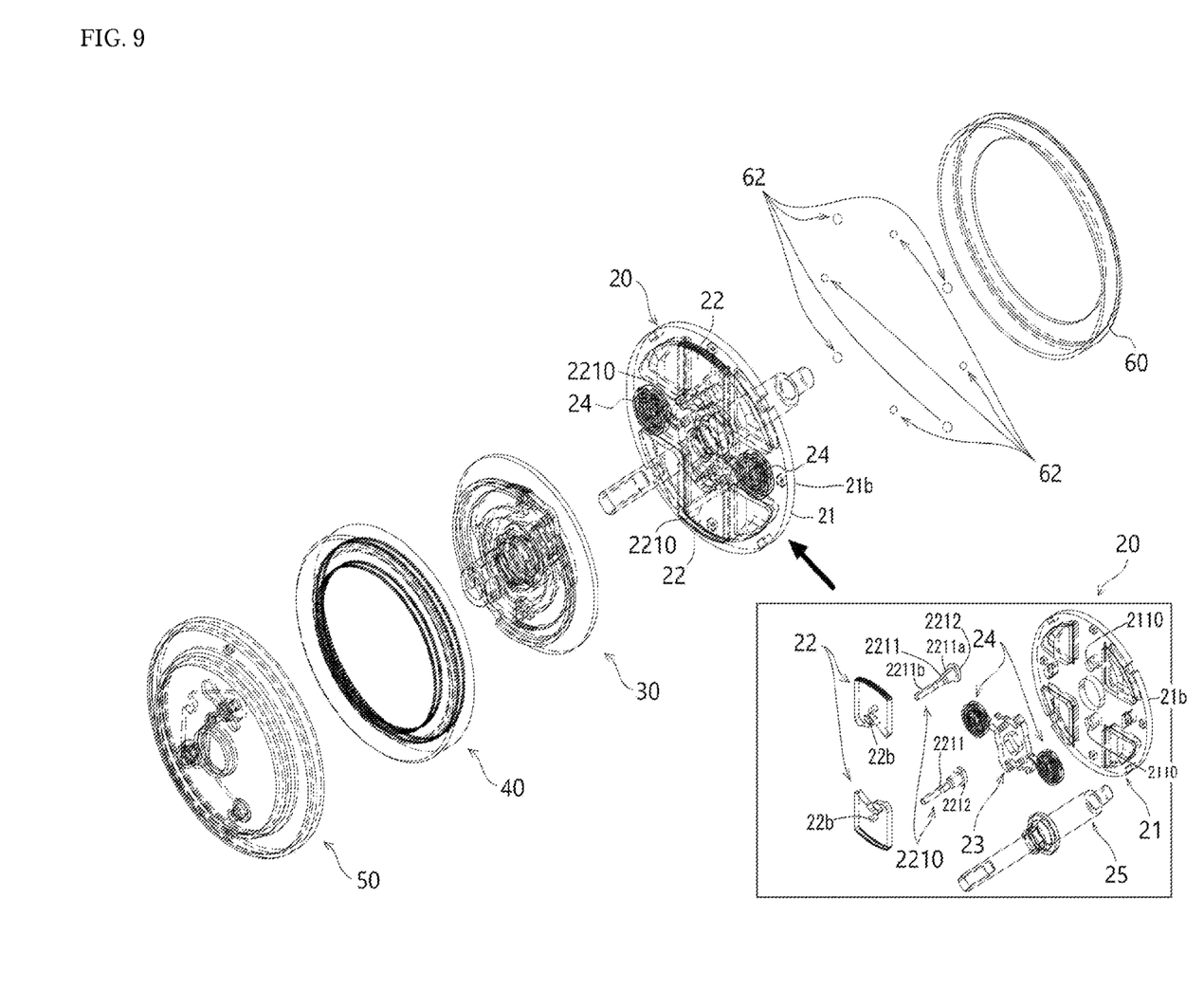
FIG. 9 is an exploded perspective view illustrating another embodiment of the present invention.
Figure 10:
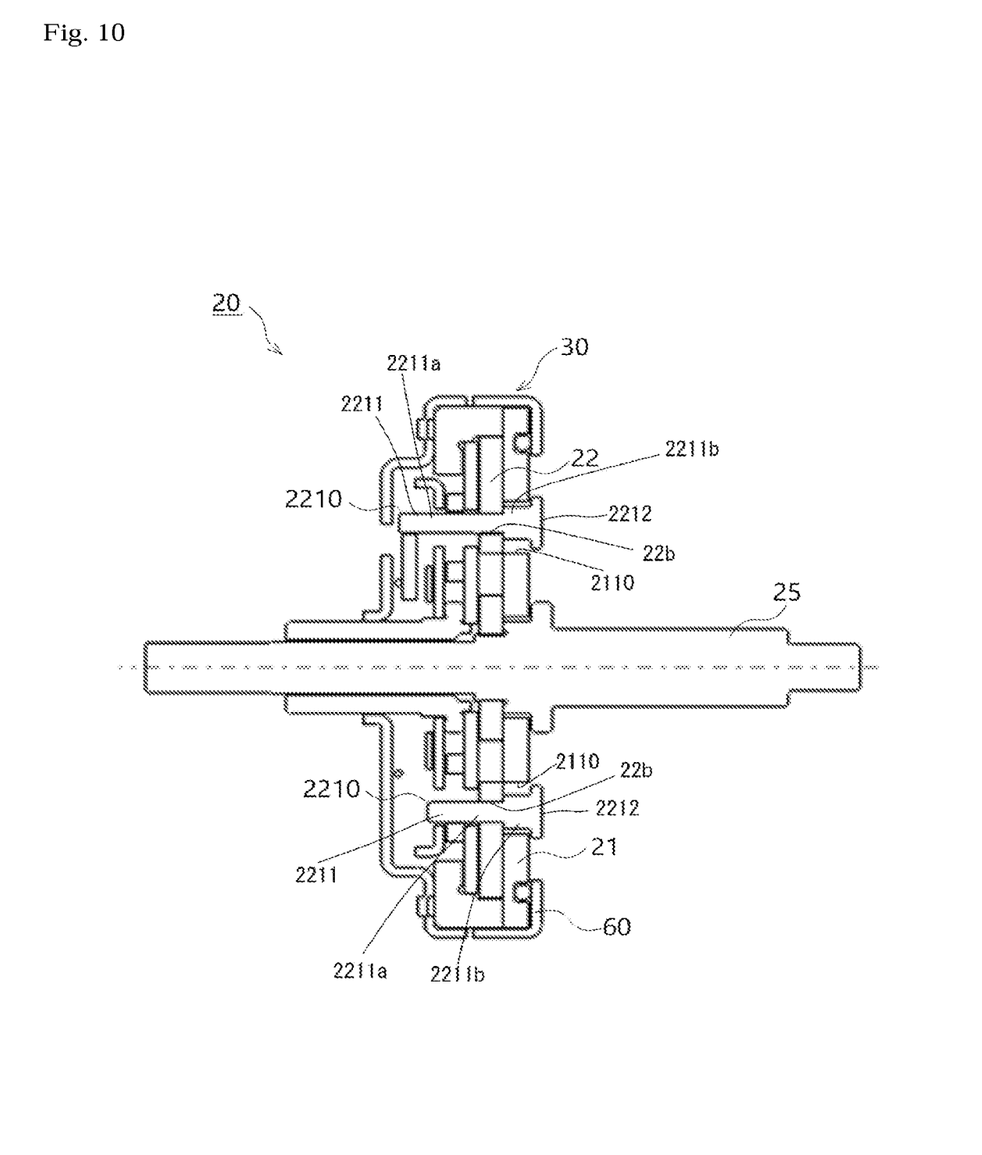
FIG. 10 is a sectional view of the embodiment in FIG. 9.

FIG. 9 and FIG. 10 each illustrate the reclining device 10 according to another embodiment of the present invention. The structures of the memory mechanism part 30, the internal gear 40, the coupling cover member 50, and the mounting ring 60 composing the reclining device 10 are exactly the same as those of the above-described embodiment, and the characteristic of having the thin annular portion and the thick annular portion of the internal gear 40 is also the same. Further, the action of the memory mechanism part 30 at the time of the memory operation is also the same. However, structures of a projecting pin 2110, the guide bracket 21, and the lock plate 22 composing the lock mechanism part 20 are different.

That is, in this embodiment, as the projecting pins 2210, 2210, flange portions 2212, 2212 are integrally provided at one ends of shaft portions 2211, 2211. The shaft portions 2211, 2211 include wide-diameter portions 2211a, 2211a each having a wide diameter on sides of the flange portions 2212, 2212 and narrow-diameter portions 2211b, 2211b each having a narrow diameter from the wide-diameter portions 2211a, 2211a to tips.

Pin restricting holes 2110, 2110 penetrating in a thickness direction are opened on a surface of the guide bracket 21 on which the lock plates 22, 22 are disposed. The pin restricting holes 2110, 2110 are formed long in the radial direction, and a width in the circumferential direction orthogonal to the radial direction (width direction) is formed to be almost the same as that of each of the wide-diameter portions 2211a, 2211a of the shaft portions 2211, 2211 of the projecting pins 2210, 2210.

Also in the lock plates 22, 22, through holes 22b, 22b through which the shaft portions 2211, 2211 of the projecting pins 2210, 2210 are inserted are formed.

The projecting pins 2210, 2210 are inserted from an axial outer end surface 21b side of the guide bracket 21 with the shaft portions 2211, 2211 on sides of the lock plates 22, 22. That causes the flange portions 2212, 2212 to come into contact with and stay on the axial outer end surface 21b of the guide bracket 21. Note that the projecting pins 2210, 2210 are preferably integrated with the lock plates 22, 22 by welding or the like. The projecting pins 2210, 2210 are inserted in the pin insertion holes 321, 321 of the memory gears 32, 32, or the like formed in the memory mechanism part 30 after the narrow-diameter portions 2211b of the shaft portions 2211 penetrate the through holes 22b, 22b of the lock plates 22, 22.

The function of the projecting pins 2210, 2210 is similar to that of the above-described embodiment, and makes the lock plates 22, 22 stay at the memory position before the walk-in operation regardless of the rotation of the memory mechanism part 30 at the time of the walk-in operation.

On the other hand, in this embodiment, the wide-diameter portions 2211a, 2211a of the projecting pins 2210, 2210 are inserted in the pin restricting holes 2110, 2110 of the guide bracket 21 as described above. The width of the pin restricting holes 2110, 2110 is almost the same as that of the wide-diameter portions 2211a, 2211a, and there is only a slight clearance for operation. Accordingly, when the lock plates 22, 22 operate in the radial direction at the time of normal locking, it is possible to reduce the wobbling caused by the movement of the lock plates 22, 22 in the circumferential direction (width direction). Further, similarly to the above-described embodiment, since the lock plates 22, 22 are disposed between the memory cam 31 of the memory mechanism part 30 and the guide bracket 21, the wobbling in the axial direction is also reduced by them, and according to this embodiment, it is possible to make the movement of the lock plates 22, 22 smoother and to also inhibit strange noise resulting from the wobbling from occurring or the like. Further, fixing the projecting pins 2210, 2210 to the lock plates 22, 22 by welding leads to an improvement in strength of the reclining device 10.

EXPLANATION OF REFERENCE SIGNS

10 reclining device
20 lock mechanism part
21 guide bracket
22 lock plate
22a locking external teeth
221 projecting pin
23 unlocking cam
24 spiral spring
30 memory mechanism part
31 memory cam
32 memory gear
32b memory external teeth
33 memory guide plate
40 internal gear
40a outer peripheral surface
41 thin annular portion
411 locking internal teeth
42 thick annular portion
421 memory internal teeth
50 coupling cover member
51 large-diameter portion
52 small-diameter portion

The invention claimed is:

1. A reclining device comprising:
   a lock mechanism part including a guide bracket coupled to one of a seat cushion and a seat back, and including lock plates movable in a radial direction along a plurality of guide wall portions provided on one surface of the guide bracket;
   an internal gear which is coupled to the other of the seat cushion and the seat back, and rotates relatively to the guide bracket; and
   a memory mechanism part which includes memory gears provided between the guide bracket and the internal gear, and memorizes a locked position of the lock plates before a walk-in operation as a memory position,
   wherein, in the internal gear, a thin annular portion and a thick annular portion whose outside diameters are the same and whose inside diameters are different are continuously provided integrally in an axial direction, and an axial outer end surface of the thick annular portion is formed to be substantially flat,
   wherein, on an inner peripheral surface of the thin annular portion, locking internal teeth with which locking external teeth provided on the lock plate engage are formed, and on an inner peripheral surface of the thick annular portion, memory internal teeth with which memory external teeth provided on the memory gear engage are formed,
   wherein a projecting pin projecting in a direction of the memory gear is provided on the lock plate,
   the projecting pin is inserted through a pin insertion hole with a predetermined length which is provided along a circumferential direction in the memory gear,
   the projecting pin moves relatively in the pin insertion hole at a time of a rotation of the memory gear, whereby the lock plate is held in the memory position,
   wherein the projecting pin is provided with a flange portion at one end of a shaft portion,
   wherein the guide bracket has a pin restricting hole which is formed long in a radial direction so as to allow the projecting pin to move in the radial direction together with the lock plate, and whose width along a direction orthogonal to the radial direction is formed to be almost the same as a diameter of the shaft portion of the projecting pin,
   wherein the projecting pin is inserted in the pin restricting hole of the guide bracket from an axial outer end side of the guide bracket, a tip of the shaft portion penetrates the lock plate to project, and the flange portion is located on the axial outer end side of the guide bracket, and
   wherein the shaft portion of the projecting pin is restricted by the pin restricting hole and can move in the radial direction with wobbling in the direction orthogonal to the radial direction of the lock plate reduced.

2. The reclining device according to claim 1, wherein a coupling cover member coupled to the seat cushion or the seat back is fixed so as to project to an outside of the axial outer end surface of the thick annular portion of the internal gear.

3. The reclining device according to claim 1, wherein the shaft portion of the projecting pin is integrated with the lock plate.

4. A seat which includes a seat cushion and a seat back, the seat comprising the reclining device according to claim 1.

* * * * *